April 9, 1957 W. L. KENNICOTT ET AL 2,787,823
TOOL HOLDER
Filed June 23, 1952
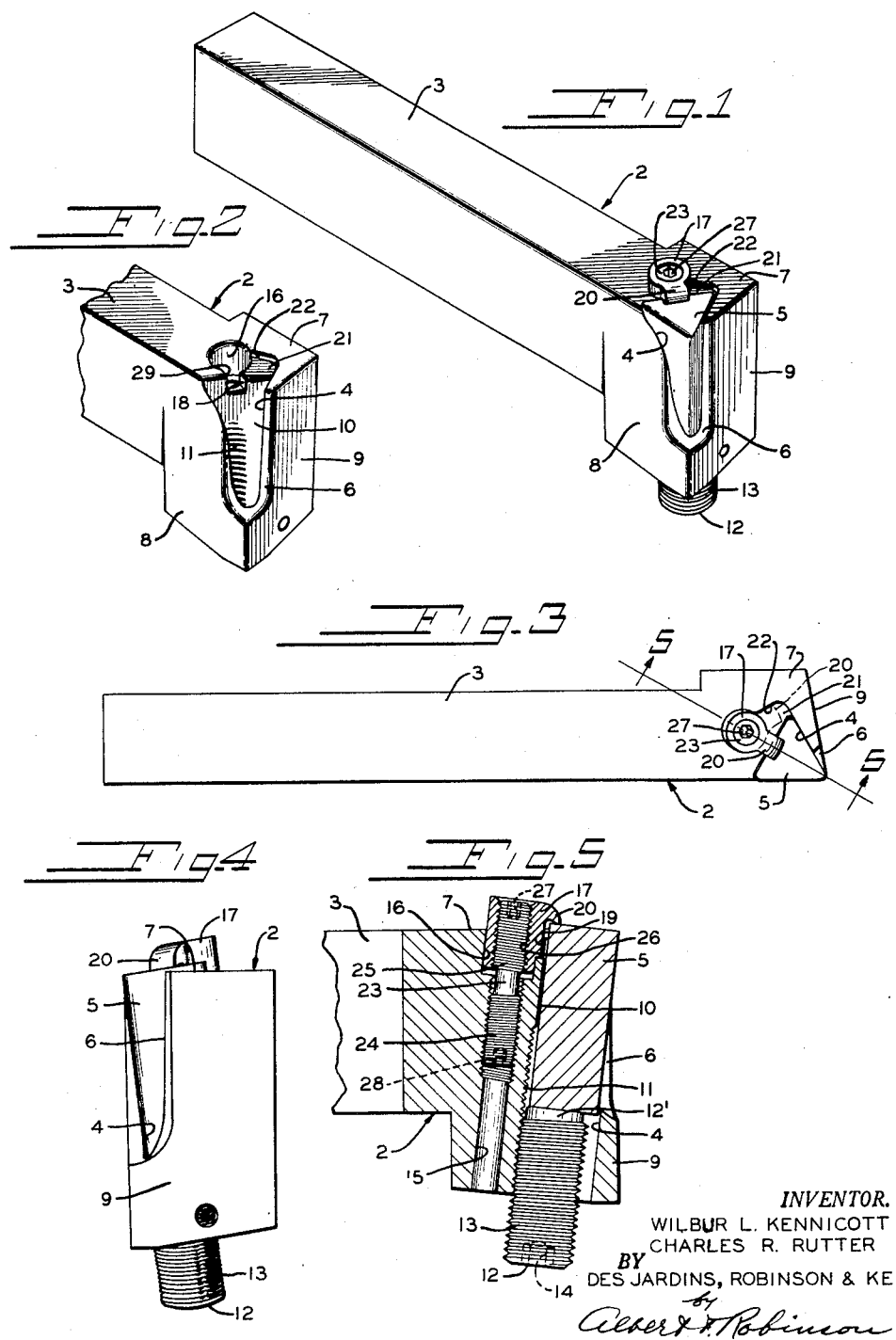
INVENTOR.
WILBUR L. KENNICOTT
CHARLES R. RUTTER
BY
DESJARDINS, ROBINSON & KEISER
THEIR ATTORNEYS United States Patent Office 2,787,823
Patented Apr. 9, 1957

2,787,823
TOOL HOLDER

Wilbur L. Kennicott and Charles R. Rutter, Latrobe, Pa., assignors to Kennametal Inc., Latrobe, Pa., a corporation of Pennsylvania Application June 23, 1952, Serial No. 294,982

5 Claims. (Cl. 29—96)

This invention relates to a tool holder for cutting inserts, and it particularly pertains to a clamp tool holder having a tool end clamping means selectively operable from either the top or bottom side of the tool holder for operating said clamp.

The clamps heretofore used for holding the cutting inserts in position have been placed on the nose or one side of the tool holder, with the result that it interferes with the work object or with moving the cutting insert into position in respect to the work object. Then, too, the means for operating the clamp is not readily accessible to be operated upon for turning or replacing the cutting insert, thereby requiring complete or partial removal of the tool holder from its support for such operations. Oftentimes there are several of the tool holders disposed side by side, closely adjacent to each other, each holding a cutting insert in working position against the work object so that access to the clamp of one holder cannot be had to remove or turn the cutting insert thereof without disturbing adjacent tool holders. Since the tool holders need to be accurately positioned in respect to the work object, time and trouble are naturally involved when any of them need to be disturbed from their adjusted working position for removing or turning the cutting insert.

Accordingly, one of the principal objects of the present invention is a tool holder in which the clamp for the cutting insert is readily accessible.

Another object of the invention is a tool holder in which the clamp is selectively accessible for being operated from either the top or bottom sides.

Another object of the invention is a tool holder in which the clamp for the insert is simple in construction and efficient in operation.

Another object of the invention is a tool holder provided with an insert clamping means which is automatically moved in and out of position over the end of the cutting insert by its operating means.

Further objects, and objects relating to details of construction and economies of operation, will readily appear in the detailed description that follows. In one instance, we have accomplished the objects of our invention by the device and means set forth in the following specification. Our invention is clearly defined and pointed out in the appended claims. A structure constituting one preferred embodiment of the invention is illustrated in the accompanying drawings in which:

Fig. 1 is a perspective view of a tool holder with a cutting insert clamped therein with a clamp embodying the invention.

Fig. 2 is a view of the cutting insert receiving end of the tool holder, similar to Fig. 1, with the accessory parts removed.

Fig. 3 is a top plan view of Fig. 1.

Fig. 4 is a detailed view of the nose end of the tool holder.

Fig. 5 is a cross sectional view on line 5—5 of Fig. 3.

Referring specifically to the drawings in which like numerals designate like parts, numeral 2 is a tool holder having a shank 3 extending from one end and a socket 4 provided in the opposite or nose end for the reception of a cutting insert 5, the socket being of a cross sectional contour conforming to that of the cutting insert which may be of cylindrical, triangular, diamond or square shape. The tool holder may be either a right or left hand one, a right hand one being shown in the drawings with a triangular insert.

A portion of the surrounding wall of the socket is cut away at the nose, in from the top side, to form an opening 6 for a portion of the cutting insert to extend therethrough so that its top cutting edge can be brought against the work object without being elevated above the top side 7 of the holder. The faces 8 and 9 of the nose are slanted downwardly and inwardly to provide clearance for the nose of the tool holder from the work object.

Intermediate portions of the sides 10 of the triangular socket wall are cylindrically concaved and screw threaded at 11 in from the bottom to receive a cylindrical plug 12 that is screw-threaded at 13 to be adjustable in the bottom of the socket axially thereof with one end 12' disposed to seat against the bottom end of the cutting insert for adjusting it in the socket. A non-circular recess 14 is formed in the bottom end of the plug 12 for the reception of a turning tool for said plug.

A bore or passage 15 is formed through the tool holder to open out at both its top and bottom sides, this opening being enlarged at 16 adjacent the top of the tool holder for reception of a sleeve 17. The wall of the enlarged opening 16, preferably adjacent the socket for the cutting insert, is cut away to form a vertical slot 18 to receive a rib 19 on the sleeve 17. The top end of the sleeve, above the rib, is provided with an overhanging lug or lip 20 disposed to seat against the top end of the cutting insert when the clamp sleeve is in clamping position with the rib vertically aligned in slot 18. The top side 7, adjacent the passage 15, of the tool holder is recessed at 21 between the insert socket wall and a shoulder 22 that provides an abutment stop for the rib 19 when the sleeve is turned counterclockwise to unclamped position, this being permitted when the bottom end of the rib is flush with the bottom of recess 21. The sleeve 17 is raised or lowered, as hereinafter described, by a rotatable plug 23 which is screw-threaded at 24 to a portion of the wall of the passage 15 and also screw-threaded at 25 to the inner wall of bore 26 of the sleeve, the screw threads being reversely or oppositely threaded so that the screw can be operated from either end.

The length of the rib 19 is such that when the sleeve is slightly elevated above the top end of the cutting insert and above the top end of slot 18, the bottom end of the rib will be flush with the bottom of the recess 21 and be free to turn counterclockwise against the stop. By turning the screw clockwise, either from the top or bottom ends, the clamp sleeve is drawn into clamping position with the end of the insert, whereas by counterclockwise turning of the screw, the clamp sleeve is released. Initial movement of the clamp sleeve from clamping position is vertical until the bottom end of the rib is flush with the bottom of recess 21, thereby permitting the sleeve to turn for the overhanging lug 20 to move away from the end of the cutting insert until the rib abuts the stop. Conversely, when the screw is turned clockwise with the sleeve in unclamped position, the initial movement of the sleeve is counterclockwise until the rib 19 is aligned with the vertical slot 18 in which position the lug 20 is overhanging the end of the cutting insert. Further movement of the screw will then draw the sleeve downward to clamp the lug 20 against the end of the cutting insert, said lug being held in this position by the rib being in the vertical slot with its bottom end being below the bottom of the recess 21, thereby preventing the sleeve from then turning. There is a non-circular socket 27 in the top end of the screw and another non-circular socket 28 in the bottom end of the screw, each for receiving a tool for turning the screw. It will be noted that because of the recess 21, the opposite wall 29 of the vertical slot 18 will also serve as a stop for the rib when the sleeve is turned clockwise, thereby keeping the rib aligned with the slot.

From the foregoing description of the invention, the operation is obvious. The screw can be adjusted from either end of the tool holder for turning it, and when the clamp is to be disengaged the sleeve will be slightly elevated for the rib to clear the vertical slot in the wall of the socket in which the sleeve moves, permitting said sleeve to turn counterclockwise to move the rib in engagement with the abutment remote from the vertical slot in which position the overhanging lug will be swung back from the end of the insert and permit said insert to be removed from its socket. When the insert has been turned or a new one inserted, turning the screw in a clockwise position will turn the sleeve for the rib to abut stop 22 with the lug overhanging the insert. Further movement will clamp the lug against the top of the insert as the sleeve is prevented from turning by reason of the rib, it being guided down into the vertical slot.

We are aware that there may be various changes in details of the construction without departing from the spirit of our invention, and, therefore, we claim our invention broadly as indicated by the appended claims.

Having thus described our invention, what we claim as new and useful and desire to secure by U. S. Letters Patent is:

1. A tool holder having a socket at one end of a shank in which a cutting insert is adapted to be held, a clamp sleeve mounted in the holder adjacent one end of the socket having a lug adapted to overhang said socket, a second socket provided in the holder for the sleeve, said second socket having a vertical slot whose top end terminates in a recess formed in the top side of the holder between oppositely disposed end stops, a rib on the sleeve fitted to slide within the vertical slot, and means for elevating the sleeve to free the rib from the vertical slot, thereby permitting the sleeve to be turned, with the rib, between the end stops of the recess.

2. The tool holder of claim 1 in which the rib is released from the vertical slot when the sleeve is elevated to move out of vertical alignment therewith and be returned into vertical alignment with said slot when the sleeve is lowered.

3. The tool holder of claim 2 in which the means for elevating or lowering the clamp is a screw fitted to the sleeve and to the holder.

4. The tool holder of claim 3 in which the screw threads between the screw and holder are reversely disposed with respect to those between the screw and the sleeve.

5. The tool holder of claim 4 in which the screw is adapted to be operated from either the top or bottom end of the tool holder.

References Cited in the file of this patent

UNITED STATES PATENTS

| | | |
|---|---|---|
| 1,290,247 | Larson | Jan. 7, 1919 |
| 1,855,971 | Kilmer | Apr. 26, 1932 |
| 2,037,346 | Severson | Apr. 14, 1936 |
| 2,062,607 | Reaney | Dec. 1, 1936 |
| 2,140,940 | Reaney | Dec. 20, 1938 |
| 2,357,918 | Trippler | Sept. 12, 1944 |
| 2,624,103 | Bader | Jan. 6, 1953 |
| 2,628,415 | Brown | Feb. 17, 1953 |
| 2,645,844 | Longe | July 21, 1953 |
| 2,697,866 | Greenleaf | Dec. 28, 1954 |

FOREIGN PATENTS

| | | |
|---|---|---|
| 617 | Austria | Nov. 25, 1899 |
| 494,973 | Germany | Mar. 31, 1930 |